United States Patent

[11] 3,534,744

| [72] | Inventors | Claude Paul Aime Pirat<br>Strasbourg-Neudorf and<br>Daniel Jean Pierre Cornil Verscheure,<br>Strasbourg, France |
|------|-----------|------|
| [21] | Appl. No. | 718,036 |
| [22] | Filed | April 2, 1968 |
| [45] | Patented | Oct. 20, 1970 |
| [73] | Assignee | Service D'Exploitation Industrielle Des Tabasc Et Des Allumettes<br>Paris, France<br>a French public establishment |
| [32] | Priority | April 3, 1967 |
| [33] | | France |
| [31] | | 101,256 |

[54] DEVICES FOR FITTING TIPS TO ROD-SHAPED OBJECTS SUCH AS CIGARS
18 Claims, 8 Drawing Figs.

[52] U.S. Cl. ............................................... 131/88, 131/90
[51] Int. Cl. ........................................ A24c 05/52, A24d 01/04
[50] Field of Search ........................................ 131/38, 90, 29, 76, 94

[56] References Cited
UNITED STATES PATENTS

| 1,830,446 | 11/1931 | Schunemann | 131/88 |
| 2,827,904 | 3/1958 | Halstead | 131/88 |
| 2,981,262 | 4/1961 | Farkas | 131/88 |
| 3,007,476 | 11/1961 | Baugher et al. | 131/88 |
| 3,097,654 | 7/1963 | Carlson | 131/88 |
| 3,398,753 | 8/1968 | Stelzer | 131/90X |

*Primary Examiner*—Samuel Koren
*Assistant Examiner*—James H. Czerwonky
*Attorney*—Sparrow and Sparrow ABSTRACT: A device for affixing tips to rod-shaped smokers' articles by forming a socket joint therewith, comprising a rotary conveyor for intermittently conveying hollow tips in turn from a tip-dispensing station to a station for fitting said tips on to one end of said articles, and means for inserting each article into a tip after having aligned the axes thereof. The conveyor has movable sockets into which said tips are firmly inserted at said dispensing station and means for rotating each socket about its axis after an article has been inserted into a tip.

Patented Oct. 20, 1970

Inventors.
Pirat, Claude Paul Aime
Verscheure, Daniel Jean
Pierre Cornil

By Sparrow and Sparrow
Attorneys

Patented Oct. 20, 1970 3,534,744

Inventors.
Pirat, Claude Paul Aime
Verscheure, Daniel Jean Pierre
Cornil

By Sparrow and Sparrow
Attorneys.

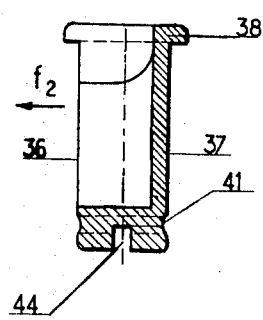
Fig. 4
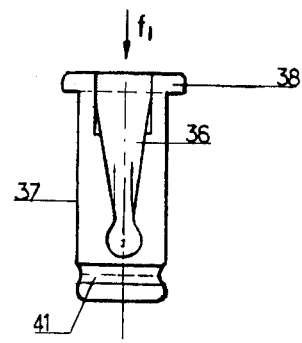
Fig. 3
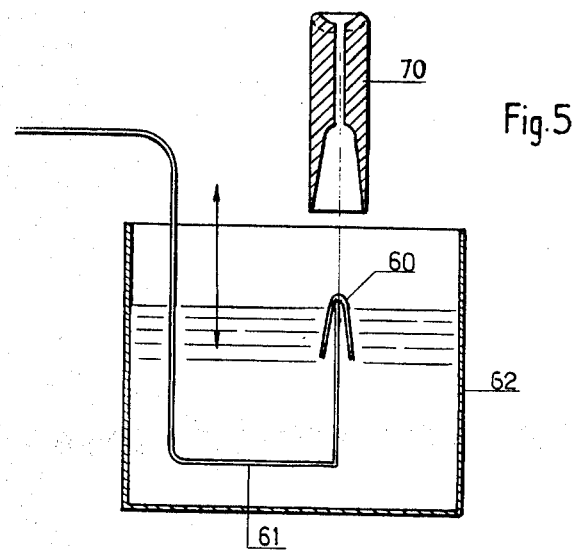
Fig. 5
Fig. 6
Inventors.
Pirat, Claude Paul Aime
Verscheure, Daniel Jean
Pierre Cornil
By. Sparrow and Sparrow
Attorneys.

DEVICES FOR FITTING TIPS TO ROD-SHAPED OBJECTS SUCH AS CIGARS

It is common practice to equip certain smokers' articles like cigars with special tips through which the article is smoked. Such tips, customarily made of plastic, form a socket joint with the mouth end of the article to be smoked (hereinafter assumed to be a cigar) and shield the smoker's lips from contact with the cigar envelope, and, especially if they are fitted with filtering elements, assist condensation of the tars carried along by the tobacco smoke. To enable such tips to be fitted advantageously in the course of manufacture, however, two heretofore somewhat incompatible conditions have to be met: firstly, the fitting must be done automatically at the same rate as the other cigar processing operations so as to avoid a break in the entire manufacturing process, and secondly the end-product must be perfect, especially in respect of adhesion of the tip to the cigar end so as to avoid troublesome parasite air inflows.

Most of the prior art devices resorted to for these operations fail to satisfactorily meet the above-mentioned two requirements. Either the special machines used are complicated, in which case not only are they costly to purchase but also difficult to dovetail into an established production cycle, or else recourse is had to devices adaptable to existing machines but which merely insert the cigar head into a tip set up in an appropriate position. It will readily be appreciated that such devices cannot ensure reliable adhesion between the two parts, especially if the outside of the cigar has dimensional irregularities (which will be all the more substantial as the module is small).

Manifestly, the present invention embraces not only cigars but any other rod-shaped smokers' article to be equipped with a tip socket-jointed thereto. In what follows, therefore, the term "cigar" is to be understood as covering any other rod-shaped article to be smoked.

It is the main object of the present invention to provide improvements to existing devices for fitting tips to rod-shaped articles, whereby to make such devices at least as effective as the complex machines specifically built for the purpose.

It is another object of the invention to provide a simple mechanism for causing a cigar or similarly shaped object and a hollow tip designed to be attached thereto to be rotated axially with respect to each other at the end of their movement towards each other or immediately subsequent thereto.

It is still another object of the invention to interconnect the drive of this axial rotation mechanism with the main drive of the system in order to ensure perfect and economic synchronization of both operations.

It is a secondary object of the invention to provide, in a device for fitting tips to cigars, a method of fitting together the cigar tip holding components that enables the latter to be replaced rapidly when a change in tip or cigar size is made.

It is yet another object of the invention to improve, where applicable, the glue distribution inside a tip to be fitted to the end of a cigar, in order to ensure even spreading over the entire periphery of the cigar-end when the same is inserted into the tip, the more so if this is accompanied by a rotation.

The above-cited objects may be achieved, jointly or separately, if one or more of the characteristic features disclosed below, some of which may be adopted singly, are added to one and the same device of the kind comprising, in addition to a first rotary conveyor for conveying hollow tips from a tip-dispensing station to a station for fitting the same to cigar-ends, a second conveyor (not shown in the drawing) for conveying the cigars to the tip-fitting station and a mechanism for inserting each cigar into a tip after the two said conveyors have aligned the axes of the cigar and the tip.

In order to rotate the tip while the cigar is being inserted into it at the fitting station, the first conveyor carries sockets rotatable about their axes and into which the tips are firmly inserted at the tip-dispensing station, and means for rotating each socket about its axis, at least when a cigar has been fully inserted into a tip.

In order to enable these sockets to rotate about their axes while remaining correctly positioned by the first conveyor, the latter comprises hollow recesses which match the outer contour of the sockets.

In order to allow the sockets to be replaced to suit the tip size to be fitted, they are rigidly united axially with their corresponding recess by the disengageable insertion of a member fixed to the recess into a peripheral groove formed in the socket.

To rotate the sockets when they are positioned at the fitting station, their end remote from the opening into which the tip and the cigar are inserted comprises a coaxial tenon-and-mortise assembly with a drive shaft that permits radial uncoupling of the sockets from said shaft.

To permit radial coupling and uncoupling of the tenon-and-mortise linking of the shaft and the sockets before and after each tip is fitted, the shaft and the engaged socket are caused to rotate through half a revolution each time a tip is fitted.

In order to allow economic automation of the system, the coupling and uncoupling of the sockets from the shaft rotating them are caused to result solely from the motion of the first conveyor.

In order to stop the sockets rotating on their conveyor between the dispensing station and the tip-fitting station on the one hand and between the tip-fitting station and the dispensing station on the other, means are provided opposite the conveyor, in fixed relationship therewith, which effect tenon-and-mortise linkings with those socket ends which couple with the drive shaft.

In order to synchronize the operations performed by the first and second conveyors with the axial rotation of the sockets, the shaft for rotating the same is coupled with the shaft driving the two conveyors and with the insertion mechanism.

The first and second conveyors advance stepwise and the camshaft controlling their motion carries a further cam which, through suitable transmission ratio, causes the socket-rotating shaft to make half a revolution after the conveyors have advanced by one step.

The means for stopping the sockets from rotation on the first conveyor are operative respectively over a distance shorter than that covered by a socket as the conveyor advances by one step, this difference being less than the outer diameter of a socket.

To permit ready removal of the sockets from their recesses by moving them away from the interior of the conveyor, the holding members can be removed individually after being moved inwardly into the conveyor.

The sockets are formed with a cutout in their wall to permit radial disengagement of the tip into which a cigar has been inserted at the tip-fitting station, and this cutout is caused to be covered opposite the tip-dispensing station by the wall of the recess inside which the socket is rotatable and to precisely register with a corresponding opening in the recess when the tip-fitting station is reached.

In order that this requirement should be consistent with rotation of the socket about its axis, the socket is caused to undergo, outside the tip-fitting station, a rotation which, to within one full revolution, cancels out the rotation imparted at the tip-fitting station.

To compensate for the initial rotation of a socket through half a revolution at the tip-fitting station, the socket subsequently has imparted to it an additional half revolution.

When said first conveyor is a transfer wheel having an even number of sockets and rotating about an axial shaft, this additional rotation is imparted to the socket diametrically opposite the one positioned at the tip-fitting station.

In order to simplify construction, the shaft imparting the initial rotation (the first half revolution) is the same as the shaft imparting the additional rotation (the second half revolution).

In order to localize the rotations, the socket rotating shaft is coupled at each end to a socket through tenon-and-mortise couplings.

In order to group all the moving parts on the same side, the socket rotating shaft is driven by a bevel pinion meshing with a bevel gear keyed to a shaft which extends concentrically through the half shaft that rotates the transfer wheel forming the first conveyor.

To enable the necessary operations to be performed within evenly spaced segments, the number of sockets on the transfer wheel is a multiple of four.

Since the transfer wheel forming the first conveyor rotates in a vertical mean plane, the tip-fitting station is caused to be positioned on its horizontal diameter, the tip-dispensing station at the top of the vertical diameter, and a possible sizing station for spreading glue inside the tips is positioned opposite said dispensing station, the sockets bearing a cigar tip passing through the glue spreading or sizing station before reaching the tip-fitting station.

In order to ensure even distribution of the glue at the bottom station, recourse is had to a sizing device in the shape of a star having at least three points and which centers itself within the cigar tip towards which it is moved axially.

In order to enable possible glue dribbles to be recovered, the sizing device has a vertical reciprocating motion between the sizing station and the glue reservoir.

The reciprocating motion of the center of the star is imparted by a U-shaped rod having one of its tips fixed to said center and the other one to drive means.

The star points are rods fixed bracket fashion uniformly around the tip of the U-shaped rod.

In order to enable the sizing index to be readily adjusted to the inner diameter of the tips, the star points can be deformed by a pressure or pull on their free ends, the central rod remaining on its vertical path.

The description which follows with reference to the accompanying nonlimitative exemplary drawings will give a clear understanding of how the invention can be carried into practice.

In the drawings:

FIGS. 3 and 4 are detailed side elevation and axial sectional showings of a transfer wheel socket;

FIG. 5 shows in vertical section the tip sizing system capable of incorporation in the present invention;

FIG. 6 is a detailed top view of the sizing device;

In what follows it will be assumed that hollow tips are to be fitted to cigars, but it is to be clearly understood that similar tips may be used for other smokers' articles such as cigarillos, cigarettes and the like without departing from the underlying principles of the invention.

Figure 1:
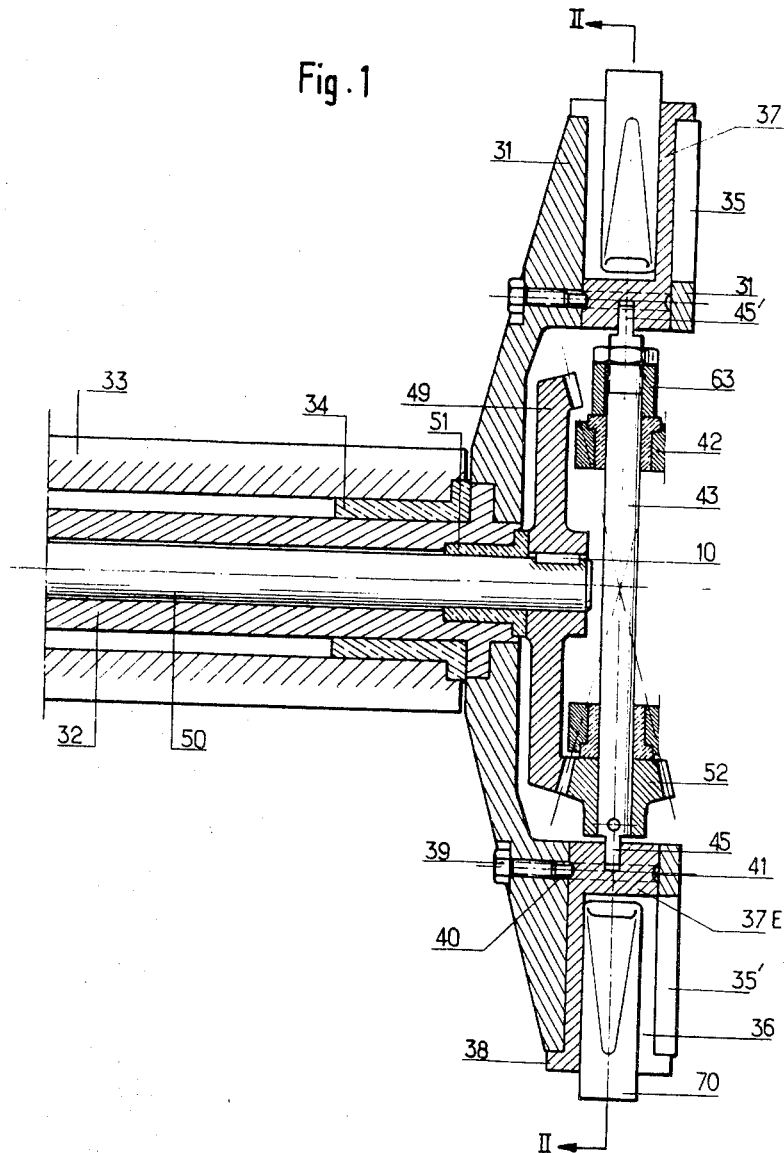
FIG. 1 is an axial sectional view of the tip transfer wheel, taken through the horizontal line I–I of FIG. 2.
Figure 2:
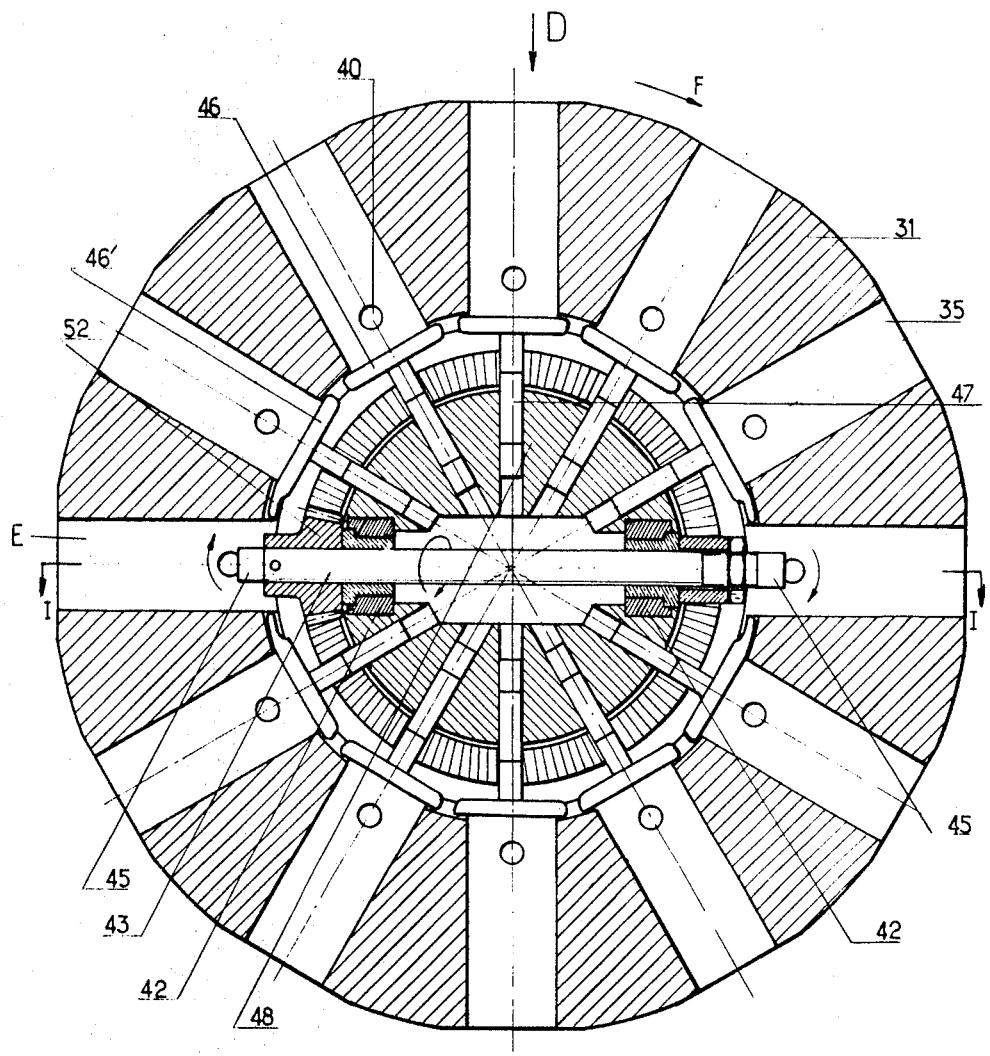
FIG. 2 is a sectional front elevation view of the tip transfer wheel, taken through the line II–II of FIG. 1, certain fixed or removable parts having been omitted for greater clarity.

Reference is first had to FIGS. 1 and 2 for a showing of a tip transfer wheel 31 mounted on its drive shaft 32 which rotates in a bearing 33—34 fixed to the machine stand. The wheel 31 is formed with substantially cylindrical radial recesses 35, of which there are twelve in the embodiment illustrated for exemplary purposes but of which there could be eight, sixteen, twenty or more without departing from the invention provided that their number is a multiple of four.

In side each recess 35 is placed a socket 37, not shown in FIG. 2 but portrayed in detail in FIGS. 3 and 4. As is clearly shown, the interior of the socket is shaped to receive a plastic cigar tip, well known per se, and communicates with the outside via cutout 36 through which a cigar tip pushed in along the axial direction of arrow f1 in FIG. 3 can be extracted in a radial direction of arrow f2. The sockets bear against the wheel 31 through a flange 38 and are retained in their respective recesses 35 by a peg 39 screwed into wheel 31 and the tip 40 of which engages a peripheral groove 41 on the socket, whereby the sockets 37 are rotatable about their axes in their recesses 35 and can readily be removed should it be desired, for instance, to change the size of the cigar tips.

The sockets are rotated at the required times by a small drive shaft 43 which rotates in two bearings 42 fast with the machine stand. Shaft 43 is driven by means to be described hereinafter and is aligned at all times with the tip-fitting station, located at the bottom of FIG. 1. In order to couple the sockets 37 in turn with shaft 43, each socket is formed with a mortise 44 (FIG. 4) which engages one of the tenons 45 or 45' formed at either end of shaft 43. When wheel 31 has lined up a socket with the tip-fitting station, the shaft 43 is rotated through half a revolution, so that when wheel 31 rotates once more the tenon 45 and the mortise 44 disengage, thereby disconnecting the shaft and the socket and allowing the next socket to be coupled.

It is to be noted that the sockets 37 couple with the shaft 43 at two diametrically opposite points on wheel 31. This is necessary in order that the cutout 36 through which the tip is discharged after it has had a cigar inserted into it at the assembling station and it has been rotated through half a revolution by the socket, should be correctly positioned when returning to said assembling station. The socket is therefore rotated through a second half revolution during its travel, the same drive shaft being used for simplicity. Obviously, however, the socket could be caused to make a complete revolution at the tip-fitting station, but this would be liable to damage the cigar head. It is therefore preferable to effect the complete revolution in two stages, of which one corresponds to a useful rotation of the tip and the other compensates for the reorientating effect of the first phase.

In order to prevent the sockets from rotating about their axes for the remainder of the transfer motion on wheel 31, they must be held in the orientation imparted by shaft 43 by suitable means. In the illustrated embodiment, this is accomplished by means of the mortises 44 on the sockets 37 released from the tenons 45 by the rotation of wheel 31. The mortises 44 engage over long members 46 disposed along sectors of the wheel 31 and fixedly restrained by rods 47 which are in turn made fast by securing screws (not shown in the drawing) with one of two supports 48 rigid with the machine stand. This arrangement enables the position of the members 46 to be adjusted with accuracy. The members 46 do not need to be mutually abutting in the rotation plan of wheel 31. It will suffice for the gap between consecutive members 46 and 46' or between a member such as 46' and a tenon 45 to be less than the diameter of a socket 37 at the level of mortise 44. Further, the mobility of the members 46 makes it possible to rapidly compensate for wear thereon provided that they are made of a material softer than the sockets 37.

Figure 7:
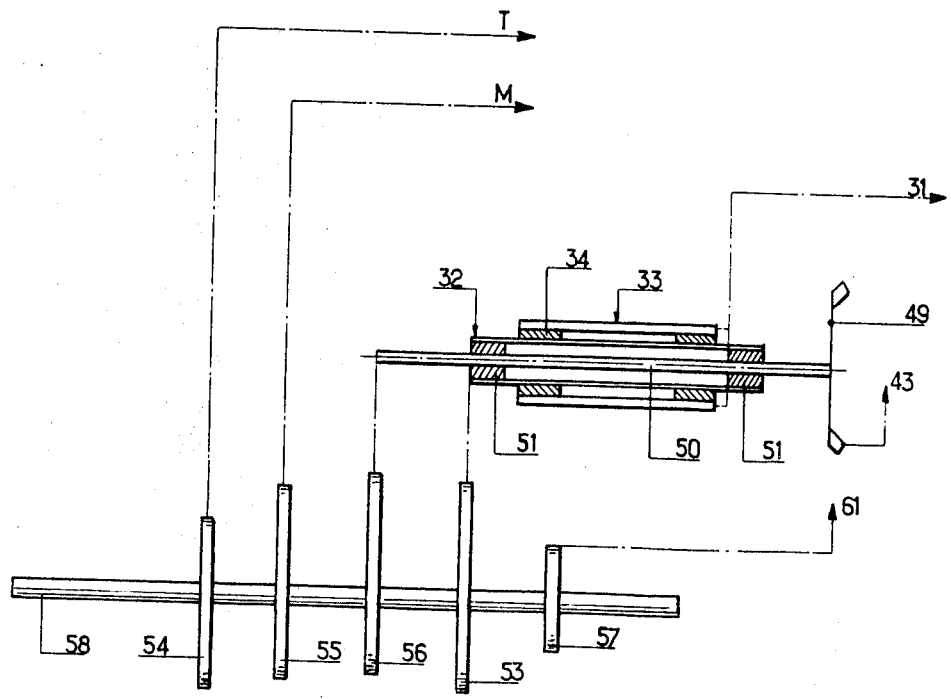
FIG. 7 is a diagrammatic showing of the drive system used in the subject device of this invention.

Shaft 43 is driven by the main drive of the machine, generally a shaft 58 extending through a sequence of cams contoured so as to correctly program the motions of the different component parts. A first cam 53, for instance, is assigned to the stepwise rotation of wheel 31, in this particular case through one-twelfth of a revolution at each machine cycle, which cycle corresponds conventionally to one revolution of the programming shaft. During this revolution a second cam 54 advances the cigar conveyor T indicated schematically in FIG. 7 through one step in such manner that a cigar is moved up each time to the tip-fitting station at the same time as the cigar which has just been tipped is transferred by the same conveyor to another station, in most cases the cellophane packaging station. A third cam 55 actuates the mechanism for inserting the cigar which had been moved to the tipping station, into the tip lined up with it by the wheel 31, this station being designated by the reference letter E in FIG. 1.

The shaft 43 is therefore rotated by a further cam 56 which for each revolution of programming shaft 58 imparts a rotation of determinate amplitude to the shaft 50 which extends right through the hollow transfer wheel drive shaft 32, and this latter shaft, in conjunction with self-lubricating bushes (of which one is shown at 51) provides bearings for shaft 50, it being necessary for the shafts 32 and 50 to be free from interaction. Keyed to shaft 50 is a bevel gear 49 meshing with a bevel pinion 52 angularly united with shaft 43 by a dowel pin or the like. In the specific embodiment illustrated, gear 49 has eighty teeth and pinion 52 twenty. Hence, to rotate shaft 43 through half a revolution, shaft 50 must make one-eighth of a revolution each time the machine advances by one step. Manifestly, other values would be feasible and it will be appreciated that if the shaft 43 were made in two parts and its end 63 made to carry a pinion identical to pinion 52, the "half revolution" requirement imposed on shaft 43 would no longer apply. The rotation of any socket 37, irrespective of the amplitude selected at the tip-fitting station, would be cancelled by the opposite rotation imparted at 63; however, this would necessitate a coupling method other than the sliding mortise-and-tenon system between shaft 43 and sockets 37, using a clutch drive for example, and this could result in less accurate positioning and increased wear.

Figure 8:
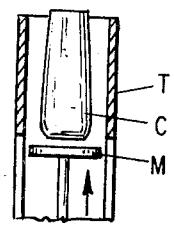
FIG. 8 illustrates schematically the pushing of a cigar into a tip.

The mode of operation of the subject tip-fitting device of the present invention has been disclosed at the same times as the component parts of the device were described, so that it will suffice to broadly retrace it: the cigar tips are positioned one by one in the various sockets at the top dead center point of the motion of transfer wheel 31 (position D in FIG. 2), and wheel 31 then rotates stepwise in the direction of arrow F through 270° in 30° increments before it reaches the tip-fitting station E. It should be noted that as the tips transit through the bottom dead center point vertically below D at the bottom of FIG. 2, they may receive a touch of semifluid glue from the improved device to be described hereinbelow, and that in the horizontal position to the right of FIG. 2 the cutout 36 will have been turned opposite the corresponding opening in recess 35. When a tip is immobilized in the position shown at E, a cigar C will have been exactly aligned with it by a conveyor T (FIG. 7), and a mechanism M also indicated schematically in FIG. 7 well known per se then inserts the cigar into the tip (FIG. 8). A conveyor T and a mechanism M is, for example, of the type shown in FIG. 11 of U.S. Pat. No. 1,830,446 which shows the structural interrelationship between the two conveyors and the mechanism. During the last part of this advancing motion and/or immediately afterwards, shaft 50 makes one-eighth of a revolution and rotates shaft 43 through half a revolution by way of the bevel coupling 49—52. The tip 70 is rotated together with the socket 37E coupled to shaft 43 and engages snugly over the cigar head, spreading the glue which may have been deposited inside. Cutout 36 then registers with the opening in recess 35', enabling the cigar fitted with its tip to be removed in the plan as shown in FIG. 1.

The above-disclosed system offers maximum advantage when the transfer path on wheel 31 includes a transit past a semifluid glue dispensing device, of which numerous types are already available. In most of these prior art devices, however, a touch of glue is deposited inside the cigar tip by a spherically headed device, resulting in numerous drawbacks, including unevenly spread glue and the risk of clogging the withdrawing conduit. It has been found that the best way is to deposit the glue along generating lines of the cone forming the inside of the tip and to provide a flexible and symmetrical assembly for the mutually contacting parts of the sizing device and the tip, whereby a self-centering system is obtained capable of adjusting to dimensional variations in the moulded plastic cigar tips.

Since the tip is cause to make half a revolution as it contacts the cigar, the glue can be most evenly spread by depositing it along the generating lines of the conical interior so as to size the surface over approximately 60°, though it is to be understood that the glue could equally be deposited on two, four, or five generating lines without departing from the scope of the improvement disclosed herein.

Reference is now had to FIG. 5 for a showing of a tip 70 sectioned through its center plan, in the position vertically below the tip-dispensing station D in FIG. 2. A sizing device shown in its lowermost position alternately dips into a glue reservoir 68 and rises to contact tip 70 via its branches 59, which branches are ordinary rods, made for instance of a ductile metal having some degree of elasticity, welded to a common point 60 fitted to the sizing device actuating rod 61. This rod is connected to a drive cam 57, in turn rotated by the main camshaft 58. Each time a cigar tip stops in the position diametrically opposite position D, the sizing device rises vertically until the branches 59 contact the interior of the tip and deposit lines of glue along the generatrixes of the interior cone, after which the sizing device descends anew to the position shown in FIG. 5 where it is recharged with glue while tip E is advanced by one step.

It will readily be appreciated that the elasticity of the branches 59 allows them to adapt to possible dimensional variations of the interior of the tip and that their ductility permits easy adjustment to suit altered dimensions by permanently deforming them, by exerting a push or pull as necessary. Lastly, the flexibility of rod 61 makes it possible to compensate automatically for possible off-center cigar tips 70 in the sockets 37. The improved sizing device hereinbefore disclosed thus offers indisputable advantages even without a device for rotating the tips as they are fitted over the cigars.

We claim:

1. A device for affixing tips to rod-shaped smoker's articles by forming a socket joint therewith, said device comprising a rotary conveyor for conveying hollow tips in turn from a tip-receiving station to a station for fitting said tips on to one end of said articles; a drive shaft on said conveyor, means for stepwise intermittently moving said conveyor for aligning the axes of successive ones of said articles and of said tips at said fitting station and means for successively inserting said articles into said tips, said conveyor comprising movable sockets into which said tips are firmly inserted at said receiving station and means for rotating said sockets about the axis thereof after one of said articles has been inserted into one of said tips.

2. A device according to claim 1, wherein said conveyor is formed with recesses to match the outer contour of the sockets.

3. A device according to claim 2, each one of said sockets having a peripheral groove and a member attached to each one of said recesses, each one of said sockets being fastened with said corresponding recesses by the disengageable penetration of said member into said peripheral groove.

4. A device according to claim 1, each one of said sockets having one end remote from the opening thereof for receiving tips and smoker's articles, said end having a coupling means consisting of a tenon-and-mortise device and a rotation imparting drive shaft coaxial with said tip-fitting station.

5. A device according to claim 1, further comprising means for causing said drive shaft and said socket coupled therewith to make half a revolution each time one of said tips is fitted.

6. A device according to claim 4, wherein operation of said tenon-and-mortise coupling device between said sockets and said drive shaft is performed circumferentially in a plane parallel to the plane of the rotation of said conveyor.

7. A device according to claim 4, further comprising fixed members for preventing rotation of said sockets by engaging with said tenon-and-mortise coupling device, said fixed members being positioned alongside the transfer path provided by said conveyor and said socket ends adapted to be coupled to said drive shaft.

8. A device according to claim 1, and a camshaft for controlling the stepwise advancing of said conveyor, a cam on said camshaft and means causing said socket rotating drive shaft to rotate through half a revolution for each step advanced by said conveyor.

9. A device according to claim 7, wherein said fixed members successively engage each of said sockets equal to the distance covered by one of said sockets as said conveyor advances by one step.

10. A device according to claim 1, wherein said sockets are formed with walls, cutouts in said walls, and recesses having an opening, each of said cutouts coinciding at said tip-fitting station with a corresponding opening in said recesses, said cutout in said socket being covered by said wall of the associated socket recess away from said fitting station.

11. A device according to claim 1, wherein said conveyor consists of a transfer wheel having an even number of sockets thereon.

12. A device according to claim 11, wherein said drive shaft imparts an additional rotation and rotates the socket at the fitting station.

13. A device according to claim 12, and a bevel pinion and a bevel gear, said drive shaft being driven by said bevel pinion and said bevel pinion meshing with said bevel gear, and a shaft, said bevel gear rigidly fastened on said shaft, and a hollow shaft driving said conveyor, said shaft extending concentrically through said hollow shaft.

14. A device according to claim 11, wherein the number of sockets on said conveyor is a multiple of four.

15. A device according to claim 8, said conveyor consists of a wheel rotating in a vertical plane and glue depositing means for depositing glue inside each tip; said glue depositing means being positioned intermediate said tip-receiving station and said tip-fitting station, and a sizing device for depositing said glue, said device consisting of a star having at least three points adapted to enter into said socket.

16. A device according to claim 15, said sizing device having a reciprocating translational motion along the axis of each one of said sockets while being stopped in the intermittent transitory motion thereof.

17. A device according to claim 15, and a U-shaped rod arranged for dipping into said glue depositing means, said rod having branches, said sizing device being supported on the tip of one of said branches, said device being actuated by one free branch of said rod.

18. A device according to claim 17, wherein said star points are rods fixed bracket-fashion equidistantly round the tip of said U-shaped rod.